United States Patent
Murata et al.

(10) Patent No.: US 10,054,026 B2
(45) Date of Patent: Aug. 21, 2018

(54) EXHAUST HEAT RECOVERY STRUCTURE

(71) Applicant: TOYOTA JIDOSHA KABUSHIKI KAISHA, Toyota-shi, Aichi-ken (JP)

(72) Inventors: Toshio Murata, Toyota (JP); Tadashi Nakagawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/150,697

(22) Filed: May 10, 2016

(65) Prior Publication Data

US 2016/0376970 A1 Dec. 29, 2016

(30) Foreign Application Priority Data

Jun. 24, 2015 (JP) ................................. 2015-126882

(51) Int. Cl.
  *F01N 3/02* (2006.01)
  *F01N 5/02* (2006.01)
  *F01N 3/28* (2006.01)

(52) U.S. Cl.
  CPC ............. *F01N 5/02* (2013.01); *F01N 3/2889* (2013.01); *F01N 2240/02* (2013.01);
  (Continued)

(58) Field of Classification Search
  CPC ............... F01N 3/2889; F01N 2410/03; F01N 2410/06; F02M 26/28; F02M 26/30; F02M 26/51
  See application file for complete search history.

(56) References Cited

U.S. PATENT DOCUMENTS 5,724,924 A * 3/1998 Michels ................. F01P 7/044
                                                         123/41.12
9,188,051 B1 * 11/2015 Zahdeh .................... F01N 5/02
(Continued)

FOREIGN PATENT DOCUMENTS

EP          1852585 A1    11/2007
JP         S54-22256 U     2/1979
(Continued)

OTHER PUBLICATIONS

Jun. 27, 2017 Office Action issued in Japanese Patent Application No. 2015-126882.

*Primary Examiner* — Mark Laurenzi
*Assistant Examiner* — Jason Sheppard
(74) *Attorney, Agent, or Firm* — Oliff PLC (57) ABSTRACT

There is provided an exhaust heat recovery structure that may suppress boiling of coolant in a heat exchanger. The exhaust heat recovery structure includes a first pipe, a second pipe, a valve and a thermostat. Exhaust gas from an engine flows in the first pipe. The second pipe branches from the first pipe and a heat exchanger that exchanges heat between the coolant and exhaust gas is provided at the second pipe. The valve is provided at the first pipe or the second pipe. The valve adjusts a flow amount of exhaust gas flowing into the second pipe by opening and closing. The thermostat is equipped with a heat-sensing portion that is disposed inside the heat exchanger. When the temperature of the heat-sensing portion is high, the thermostat opens or closes the valve to reduce the flow amount of exhaust gas flowing into the second pipe.

13 Claims, 6 Drawing Sheets

(52) U.S. Cl.
CPC ...... *F01N 2240/36* (2013.01); *F01N 2410/03* (2013.01); *F01N 2410/06* (2013.01); *Y02T 10/16* (2013.01)

(56) References Cited

U.S. PATENT DOCUMENTS

| | | | |
|---|---|---|---|
| 9,306,143 B2* | 4/2016 | Ranalli | H01L 35/30 |
| 2012/0151999 A1 | 6/2012 | Seybold et al. | |
| 2015/0129173 A1* | 5/2015 | Seon | F01P 3/00 |
| | | | 165/100 |
| 2015/0219236 A1* | 8/2015 | Seon | F16K 1/30 |
| | | | 165/297 |
| 2015/0354438 A1 | 12/2015 | Shinpo et al. | |

FOREIGN PATENT DOCUMENTS

| | | |
|---|---|---|
| JP | 2006-312884 A | 11/2006 |
| JP | 2007-100665 A | 4/2007 |
| JP | 2009-209913 A | 9/2009 |
| JP | 2010-144566 A | 7/2010 |
| JP | 2010-229847 A | 10/2010 |
| JP | 2012-21421 A | 2/2012 |
| JP | 2015-229978 A | 12/2015 |

* cited by examiner

EXHAUST HEAT RECOVERY STRUCTURE

CROSS-REFERENCE TO RELATED APPLICATION

This application is based on and claims priority under 35 USC 119 from Japanese Patent Application No. 2015-126882 filed on Jun. 24, 2015, which is incorporated by reference herein.

BACKGROUND

Technical Field

The present invention relates to an exhaust heat recovery structure.

Related Art

An exhaust heat recovery structure is known that heats a coolant and accelerates warm-up of an engine, by a heat exchanger being disposed on an exhaust pipe through which exhaust gas from the engine flows and heat being exchanged between coolant that flows in the heat exchanger and the exhaust gas. A configuration of this exhaust heat recovery structure is disclosed in Japanese Patent Application Laid-Open (JP-A) No. 2006-312884 (Patent Document 1), which is equipped with a bypass pipe through which exhaust gas flows, a valve body (valve) provided inside the bypass pipe, and a branch pipe that branches from the bypass pipe and is connected to a heat exchanger. A further configuration is recited in which a temperature of the coolant circulating through the heat exchanger is sensed and the valve body is controlled to open or close in accordance with this temperature.

However, the technology disclosed in Patent Document 1 gives no consideration to the location at which the temperature of the coolant is sensed, and it may not be possible to accurately acquire a temperature of the coolant in the heat exchanger. Consequently, when the temperature of the coolant in the heat exchanger rises, the coolant may boil.

SUMMARY

In consideration of the circumstances described above, an object of the present invention is to provide an exhaust heat recovery structure that may suppress boiling of coolant in a heat exchanger.

An exhaust heat recovery structure according to a first aspect of the present invention includes: a first pipe through which exhaust gas from an engine flows; a second pipe that branches from the first pipe and at which a heat exchanger is provided, the heat exchanger exchanging heat between a coolant and exhaust gas; a valve provided at one of the first pipe or the second pipe, the valve adjusting a flow amount of exhaust gas flowing into the second pipe by opening and closing; and a thermostat equipped with a heat-sensing portion that is disposed at an interior of the heat exchanger, the thermostat opening or closing the valve and reducing the flow amount of exhaust gas flowing into the second pipe when a temperature of the heat-sensing portion is high.

In the exhaust heat recovery structure according to the first aspect, the second pipe branches from the first pipe and the heat exchanger is provided at the second pipe. The valve is provided at the first pipe or the second pipe, and the first pipe or second pipe is opened and closed by this valve being operated. Thus, flow amounts of exhaust gas flowing in the second pipe can be adjusted. If, for example, the valve is provided in the first pipe, in the state in which the first pipe is closed by the valve, almost all of the exhaust gas from the engine flows into the second pipe, heat is exchanged between the coolant and the exhaust gas by the heat exchanger, and the coolant is heated. Hence, warm-up of the engine at a time of cold starting may be accelerated. In contrast, in the state in which the first pipe is opened by the valve, most of the exhaust gas from the engine flows in the first pipe, and hardly any of the exhaust gas flows in the second pipe. Hence, there is hardly any heat exchange between the coolant and the exhaust gas, and a rise in temperature of the coolant after warm-up of the engine or the like may be suppressed. On the other hand, if the valve is provided in the second pipe, in the state in which the second pipe is closed by the valve, hardly any of the exhaust gas flows in the second pipe. In contrast, in the state in which the second pipe is opened by the valve, the exhaust gas flows into the second pipe. Therefore, heat is exchanged between the coolant and the exhaust gas by the heat exchanger and the coolant may be heated.

The thermostat equipped with the heat-sensing portion is provided with the heat-sensing portion of the thermostat disposed inside the heat exchanger. When the temperature of the heat-sensing portion rises, the thermostat opens or closes the valve to reduce the flow amount of exhaust gas flowing into the second pipe. Therefore, in contrast to a structure in which a heat-sensing portion is disposed outside a heat exchanger, the valve may be operated before a temperature of coolant in the heat exchanger rises excessively. That is, the flow amount of exhaust gas flowing into the second pipe may be reduced and a rise in the temperature of the coolant may be suppressed before the coolant in the heat exchanger boils.

In an exhaust heat recovery structure according to a second aspect, in the first aspect, the heat-sensing portion is disposed at a vehicle upper side of the interior of the heat exchanger.

In the exhaust heat recovery structure according to the second aspect, because the temperature of coolant in the heat exchanger that is at the vehicle upper side—and is at a higher temperature among temperatures of the coolant—is sensed, boiling of the coolant may be suppressed effectively. That is, higher-temperature exhaust gas flows in the upper portions of the first pipe and the second pipe more than in the lower portions. Therefore, the coolant flowing through the vehicle upper side of the heat exchanger is subject to heat exchange from the higher-temperature exhaust gas and is likely to be at a higher temperature than coolant at the vehicle lower side of the heat exchanger. Therefore, if the temperature of the coolant at the vehicle upper side of the heat exchanger is sensed and flow amounts of the exhaust gas flowing into the second pipe are adjusted in accordance with this temperature, boiling of the coolant may be suppressed effectively.

In an exhaust heat recovery structure according to a third aspect, in the first aspect or the second aspect, a circulation pump that circulates the coolant between the engine and the heat exchanger is provided, the circulation pump being temporarily stopped at a time of cold starting.

In the exhaust heat recovery structure according to the third aspect, the temperature of coolant in the heat exchanger may be raised, within a range in which the coolant does not boil, by the circulating pump being temporarily stopped at a time of cold starting. When the circulation pump is then re-started, the engine may be warmed up by the high-temperature coolant and warm-up performance of the engine may be improved.

As described hereabove, according to the exhaust heat recovery structure according to the first aspect, there is an excellent effect in that boiling of the coolant in the heat exchanger may be suppressed.

According to the exhaust heat recovery structure according to the second aspect, there is an excellent effect in that boiling of the coolant may be suppressed effectively.

According to the exhaust heat recovery structure according to the third aspect, there is an excellent effect in that warm-up performance of the engine may be improved.

BRIEF DESCRIPTION OF DRAWINGS

FIG. 6 is a sectional diagram showing a state in which FIG. 4 is cut along line 6-6.

DETAILED DESCRIPTION

—First Exemplary Embodiment—

An exhaust heat recovery structure according to a first exemplary embodiment is described with reference to FIG. 1 to FIG. 3. The arrow FR that is shown as appropriate in the drawings indicates the vehicle front side of a vehicle in which the exhaust heat recovery structure is employed, the arrow UP indicates the vehicle upper side, and the arrow RH indicates the vehicle right side. In the following descriptions, where the directions front, rear, up, down, left and right are used without being particularly specified, the same represent the front and rear in the vehicle front-and-rear direction, up and down in the vehicle up-and-down direction, and left and right if facing in the running direction. For convenience of depiction, pipes are shown in section in the drawings.

Figure 1:
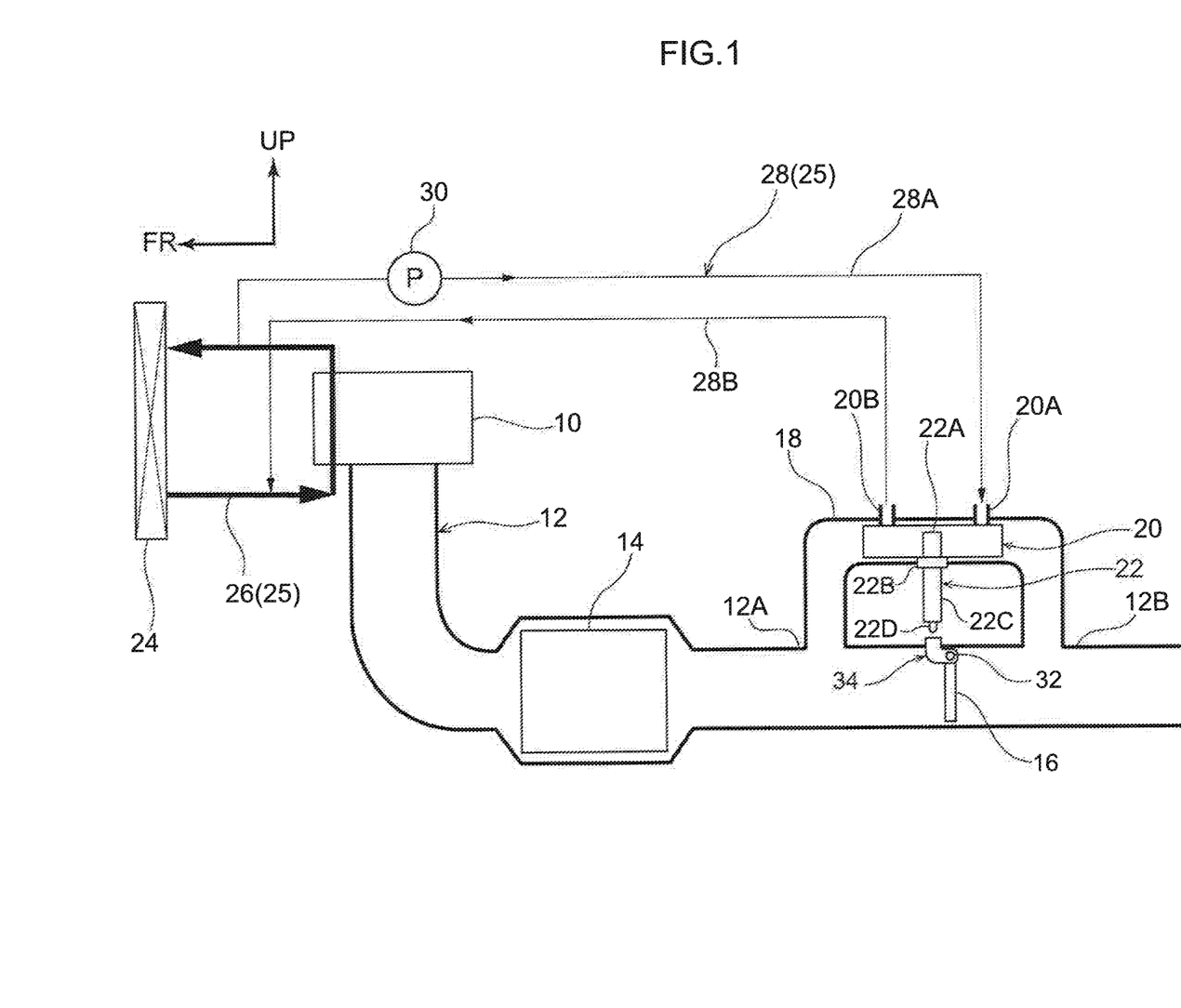
FIG. 1 is a diagram schematically showing an exhaust heat recovery structure in accordance with a first exemplary embodiment.

As shown in FIG. 1, an exhaust system in which the exhaust heat recovery structure according to the present exemplary embodiment is employed has a structure in which a first pipe 12 is connected to an engine 10 and exhaust gas from the engine 10 flows in the first pipe 12.

The first pipe 12 extends toward the vehicle lower side from the engine 10 and then extends toward the vehicle rear side. A catalytic converter 14 is disposed at the first pipe 12, at the downstream side from the engine 10. The term "downstream" as used herein refers to downstream in a flow direction of exhaust gas. Where the terms "upstream" and "downstream" are used in the descriptions below, these refer to upstream and downstream in the flow direction of exhaust gas.

The catalytic converter 14 is a tubular member, both end portions of which are open. A catalytic carrier for cleaning gases is provided inside the catalytic converter 14. The catalytic carrier is formed by a thin plate, which is formed in a honeycomb pattern, a wave shape or the like, being structured into a spiral shape, concentric rings or the like. Thus, the catalytic carrier is formed in a circular rod shape or a circular tube shape that enlarges the surface area of the material of the catalytic carrier. The catalytic carrier carries a catalyst (platinum, palladium, rhodium or the like) in a state in which the catalyst is adhered to the surface of the catalytic carrier.

A branch point 12A is provided in the first pipe 12, at the downstream side relative to the catalytic converter 14. A second pipe 18 branches from the first pipe 12 at the branch point 12A. In other words, the second pipe 18 is connected to the branch point 12A of the first pipe 12.

The second pipe 18 extends to the vehicle upper side from the branch point 12A, then inflects to the vehicle front-and-rear direction and extends substantially in parallel with the first pipe 12. The second pipe 18 joins the first pipe 12 at a junction point 12B at the downstream side relative to a valve 16, which is described below. The second pipe 18 is formed to be wider in the vehicle width direction than the first pipe 12.

A heat exchanger 20 is provided at the second pipe 18. The heat exchanger 20 is disposed inside the second pipe 18. A flow channel along which coolant flows is provided inside the heat exchanger 20. An inlet portion 20A and an outlet portion 20B are provided at the heat exchanger 20. Coolant that has circulated through the engine 10 is fed in through the inlet portion 20A, and the coolant is fed out through the outlet portion 20B. Accordingly, in the heat exchanger 20, heat is exchanged between exhaust gas flowing along the second pipe 18 and the coolant.

In this exemplary embodiment, a thermostat 22 is mounted at the heat exchanger 20. The thermostat 22 is described below.

Now, a circulation channel 25 for the coolant is described. The circulation channel 25 includes a circulation pipe 26 and a recovery pipe 28. The circulation pipe 26 is provided so as to circulate coolant between the engine 10 and a radiator 24. The recovery pipe 28 includes an inlet flow channel 28A and an outlet flow channel 28B. The inlet flow channel 28A feeds a portion of coolant into the heat exchanger 20 from partway along the circulation pipe 26. The outlet flow channel 28B returns coolant from the heat exchanger 20 to the circulation pipe 26.

To be specific, the inlet flow channel 28A branches from the flow channel of the circulation pipe 26 running from the engine 10 to the radiator 24. A circulation pump 30 is provided on the inlet flow channel 28A, and the inlet flow channel 28A is structured such that coolant may be circulated between the engine 10 and the heat exchanger 20. In this exemplary embodiment, the portion of coolant flowing along the circulation pipe 26 is caused to flow into the inlet flow channel 28A by the circulation pump 30, and the coolant is fed from the inlet flow channel 28A through the inlet portion 20A into the heat exchanger 20.

The outlet flow channel 28B is also connected to the outlet portion 20B of the heat exchanger 20. Thus, the outlet flow channel 28B is structured such that coolant that has passed through the heat exchanger 20 is fed out through the outlet portion 20B to the outlet flow channel 28B. The coolant flowing through the outlet flow channel 28B is then returned to a flow channel from the radiator 24 toward the engine 10.

Now, the valve 16 and the thermostat 22 are described. As shown in FIG. 2, the valve 16 is provided between the branch point 12A and junction point 12B of the first pipe 12. The valve 16 is formed by a member with a substantially flat plate shape. Viewed from the vehicle front side thereof, the valve 16 is formed in a substantially circular shape that corresponds with a cross-sectional shape of the first pipe 12. In this exemplary embodiment, an upper end portion of the valve 16 is fixed to a turning rod 32 that extends in the vehicle width direction. Thus, the valve 16 is made swingable about the turning rod 32. The first pipe 12 is opened and closed by the valve 16 swinging. In the closed state, the valve 16 is disposed in a direction (the vehicle up-and-down direction) that is orthogonal to an axial direction of the first pipe 12 (the vehicle front-and-rear direction). The valve 16 is urged in the direction of closing by an urging member such as a spring or the like, which is not shown in the drawings.

The turning rod 32 extends outside the first pipe 12. A driving cam 34 is fixed to the turning rod 32. The driving cam 34 is formed substantially in an "L" shape in a side view seen in the vehicle width direction. The driving cam 34 includes a vertical portion 34A that extends in the vehicle up-and-down direction and a horizontal portion 34B that extends to the vehicle rear side. A lower end portion of the vertical portion 34A and a front end portion of the horizontal portion 34B are joined together. For convenience of explanation, the driving cam 34 and the thermostat 22, which is described below, are shown in FIG. 1 to FIG. 3. In practice, however, the driving cam 34 and the thermostat 22 would be disposed to the paper surface side of the drawing relative to the first pipe 12.

A penetrating hole is formed in a rear end portion of the horizontal portion 34B of the driving cam 34. The turning rod 32 penetrates through this penetrating hole, and the horizontal portion 34B is fixed to the turning rod 32. Thus, in this structure, the turning rod 32 is turned and the valve 16 is swung by the driving cam 34 swinging about the rear end portion of the horizontal portion 34B.

The thermostat 22 is disposed above the vertical portion 34A of the driving cam 34. In the present exemplary embodiment, a thermostat utilizing a wax thermostatic element is employed as the thermostat 22. The thermostat 22 principally includes a heat-sensing portion 22A, a large diameter portion 22B, a shaft cover 22C and a shaft 22D.

The heat-sensing portion 22A is formed in a substantially circular tube shape of which an upper end portion is closed off. The heat-sensing portion 22A extends as far as the vehicle upper side of the interior of the heat exchanger 20. That is, an upper end portion of the heat-sensing portion 22A is disposed at the vehicle upper side of the interior of the heat exchanger 20. Thus, the heat-sensing portion 22A senses a temperature of coolant at the vehicle upper side inside the heat exchanger 20. Paraffin wax, which is not shown in the drawings, is accommodated inside the heat-sensing portion 22A. Although the heat-sensing portion 22A is disposed within the heat exchanger 20, the heat-sensing portion 22A is represented by solid lines in FIG. 1 to FIG. 3 for convenience of depiction.

The large diameter portion 22B is formed at the vehicle lower side of the heat-sensing portion 22A. The large diameter portion 22B is formed in a substantially circular tube shape with a larger diameter than the heat-sensing portion 22A. The large diameter portion 22B is disposed at the exterior of the heat exchanger 20. A diaphragm, which is not shown in the drawings, extends across the interior of the large diameter portion 22B and seals in the paraffin wax accommodated in the heat-sensing portion 22A. The shaft cover 22C and shaft 22D are provided at the vehicle lower side of the large diameter portion 22B. The shaft cover 22C is formed in a substantially circular tube shape with a smaller diameter than the large diameter portion 22B. The shaft 22D, with a substantially circular rod shape, is accommodated inside the shaft cover 22C.

In the present exemplary embodiment, at a usual temperature (for example, 25° C.), only a distal end portion of the shaft 22D protrudes from the shaft cover 22C. When the heat-sensing portion 22A is heated, the paraffin wax expands and pushes the diaphragm down, moving the shaft 22D toward the vehicle lower side. As a result, a protrusion amount of the shaft 22D from the shaft cover 22C increases. In other words, the shaft 22D elongates to the vehicle lower side from the shaft cover 22C.

Figure 3:
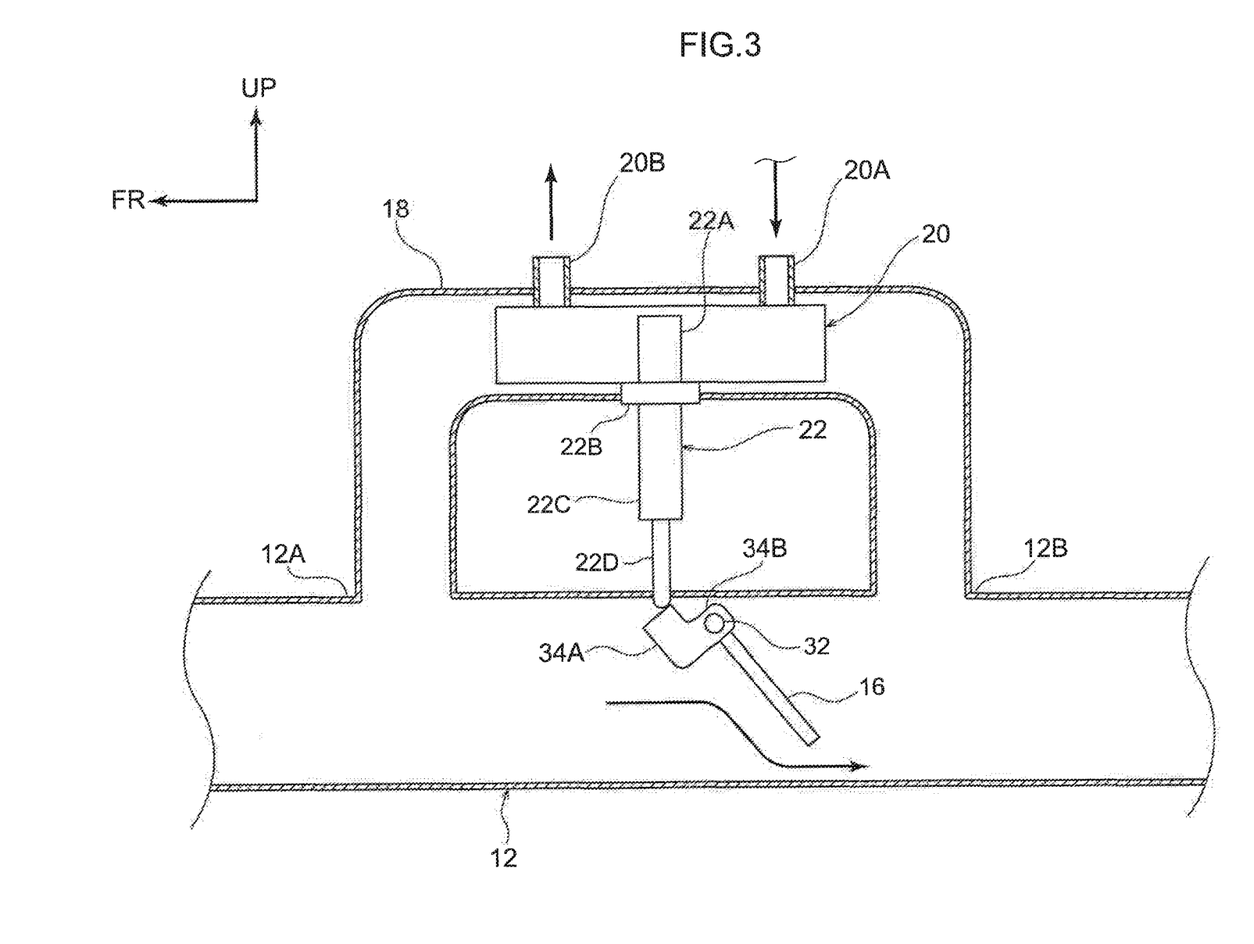
FIG. 3 is a sectional diagram corresponding to FIG. 2, showing a state in which the valve is opened.

As shown in FIG. 3, in a state in which the shaft 22D has elongated and is pushing down on the driving cam 34, the turning rod 32 turns in the counterclockwise direction. Consequently, via the turning rod 32, the valve 16 swings to the vehicle rear side. As a result, the first pipe 12 is mechanically opened. When the first pipe 12 has been opened, a portion of the exhaust gas from the engine 10 passes the valve 16 and flows toward the vehicle rear side. Therefore, a flow amount of exhaust gas flowing into the second pipe 18 decreases. That is, flow amounts of exhaust gas flowing into the second pipe 18 are adjusted by the valve 16 opening and closing. In the present exemplary embodiment, the composition and the like of the wax are adjusted such that the shaft 22D pushes the driving cam 34 down at a stage at which the heat-sensing portion 22A has been heated to approximately 70° C.

Now, a warm-up process of the engine 10 at a time of cold starting is described. First, a process for warming up the engine 10 in a state in which the circulation pump 30 is operated is described.

As shown in FIG. 1, the circulation pump 30 circulates coolant between the engine 10 and the heat exchanger 20. When the engine 10 is started, exhaust gas from the engine 10 is exhausted into the first pipe 12.

Figure 2:
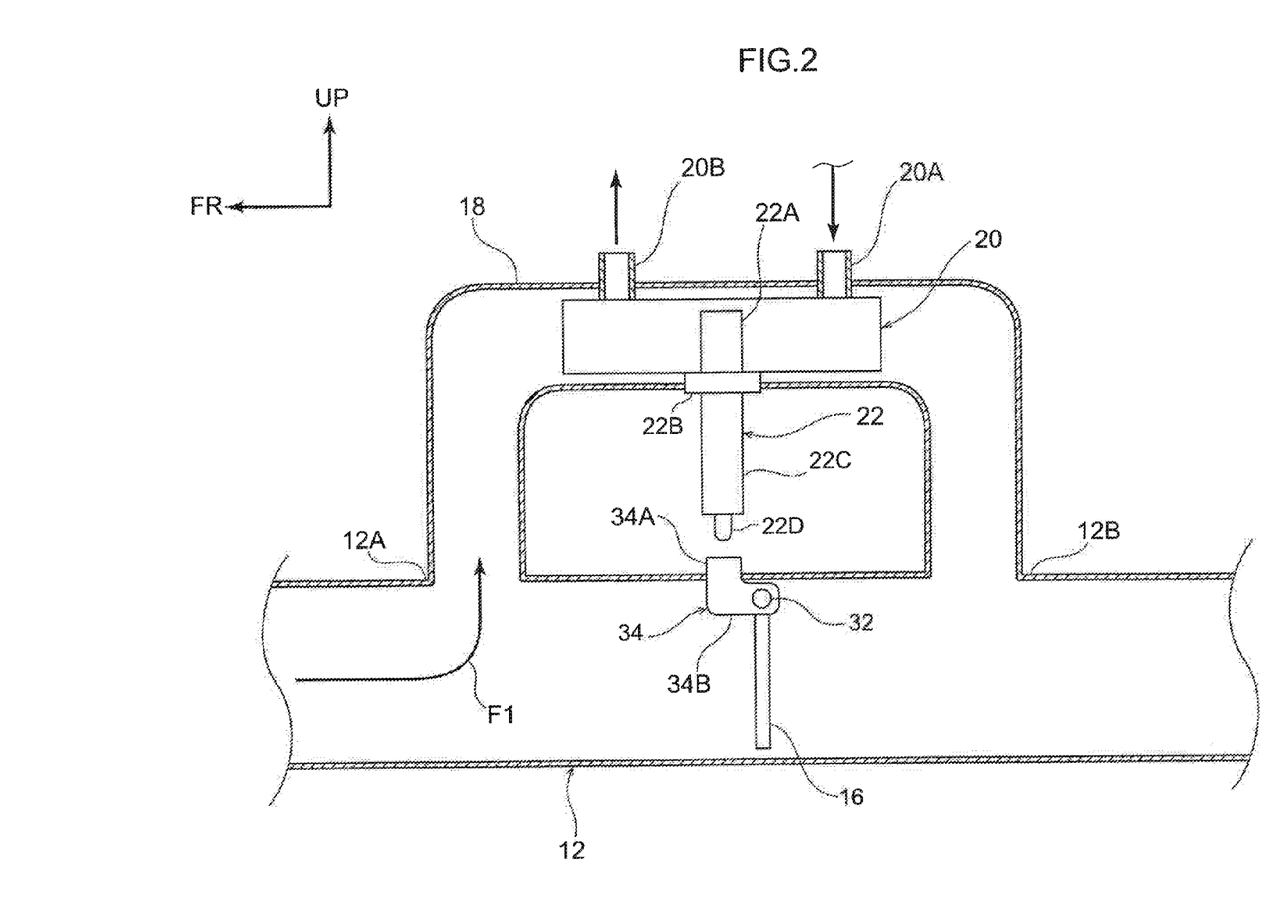
FIG. 2 is a sectional diagram showing principal portions of the exhaust heat recovery structure in accordance with the first exemplary embodiment, showing a state in which a valve is closed.

As shown in FIG. 2, after the cold start, the valve 16 is kept in the closed state. Therefore, as illustrated by arrow F1, almost all of the exhaust gas from the engine 10 flows into the second pipe 18. Because the exhaust gas flows through the second pipe 18, heat is exchanged between coolant flowing in the heat exchanger 20 and the exhaust gas, heating the coolant. The heated coolant is fed out through the outlet portion 20B to the outlet flow channel 28B and flows into the circulation pipe 26. Warm-up of the engine 10 is accelerated by this heated coolant flowing inside the engine 10 (see FIG. 1).

As the warm-up of the engine 10 proceeds, the temperature of the coolant rises, and the temperature of the heat-sensing portion 22A of the thermostat 22 disposed inside the heat exchanger 20 also rises. As the temperature of the heat-sensing portion 22A rises, the shaft 22D elongates to the vehicle lower side.

At a time at which the temperature of the heat-sensing portion 22A rises above a predetermined temperature (for example, 70° C.), the shaft 22D abuts against the driving cam 34 and the driving cam 34 is pushed down by the shaft 22D. As a result, the valve 16 swings toward the vehicle rear side via the turning rod 32 and the first pipe 12 is opened. Hence, as illustrated by arrow F2 in FIG. 3, a portion of the exhaust gas flows through the first pipe 12. Thus, a flow amount of the exhaust gas flowing into the second pipe 18 is reduced.

Because the flow amount of exhaust gas flowing into the second pipe 18 is reduced, heat exchange between the exhaust gas and the coolant ceases and the temperature of the coolant falls. Hence, the coolant takes heat from the engine 10 and the temperature of the engine 10 is kept constant.

Now, a case in which the circulation pump 30 is stopped at a time of cold starting is described.

When the circulation pump 30 is stopped, the flow of coolant circulating between the engine 10 and the heat exchanger 20 stops. Therefore, coolant is heated in the engine 10. Thus, warm-up performance of the engine 10 may be improved.

Meanwhile, coolant that is in the heat exchanger 20 is also heated. If the temperature of the coolant in the heat exchanger 20 rises above the predetermined temperature while the circulation pump 30 is stopped, the shaft 22D of the thermostat 22 pushes down on the driving cam 34 as described above. As a result, the first pipe 12 is opened, a flow amount of exhaust gas flowing into the second pipe 18 is reduced, and boiling of the coolant is suppressed.

—Operation and Effects—

Now, operation and effects of the exhaust heat recovery structure according to the present exemplary embodiment are described.

In the present exemplary embodiment, because the heat-sensing portion 22A of the thermostat 22 is disposed inside the heat exchanger 20, the valve 16 may be pushed open by the shaft 22D earlier than in a structure in which the heat-sensing portion 22A is disposed outside the heat exchanger 20. Therefore, boiling of coolant in the heat exchanger 20 may be suppressed.

In the present exemplary embodiment, because the heat-sensing portion 22A of the thermostat 22 is disposed at the vehicle upper side of the interior of the heat exchanger 20, the temperature of coolant whose temperature is higher may be sensed. That is, of exhaust gas flowing through the second pipe 18, higher temperature exhaust gas flows at the vehicle upper side of the second pipe 18. Therefore, coolant that is at the vehicle upper side of the interior of the heat exchanger 20 is at a higher temperature. As a result, boiling of the coolant may be suppressed effectively.

In the present exemplary embodiment, at a time of cold starting, the coolant in the heat exchanger 20 may be heated further by the circulation pump 30 being temporarily stopped. As a result, warm-up performance of the engine 10 may be improved.

In the present exemplary embodiment, because the thermostat 22 is mounted to be oriented downward, maintenance, replacement and the like in the vehicle-mounted state may be made easier than in a structure in which the thermostat 22 is mounted to be oriented in the vehicle front-and-rear direction. Thus, serviceability may be improved.

—Second Exemplary Embodiment—

Figure 4:
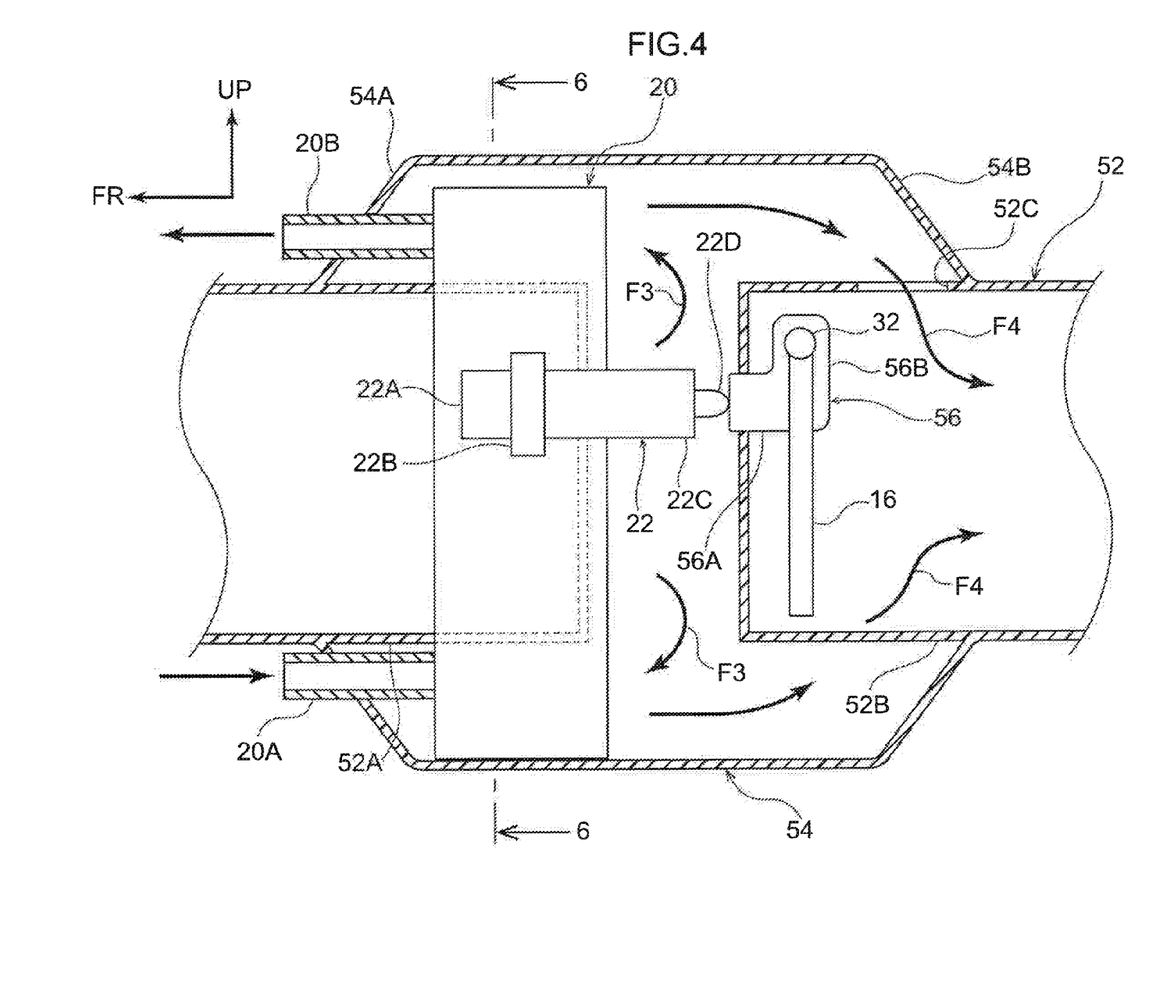
FIG. 4 is a sectional diagram showing principal portions of an exhaust heat recovery structure in accordance with a second exemplary embodiment, showing a state in which a valve is closed.
Figure 5:
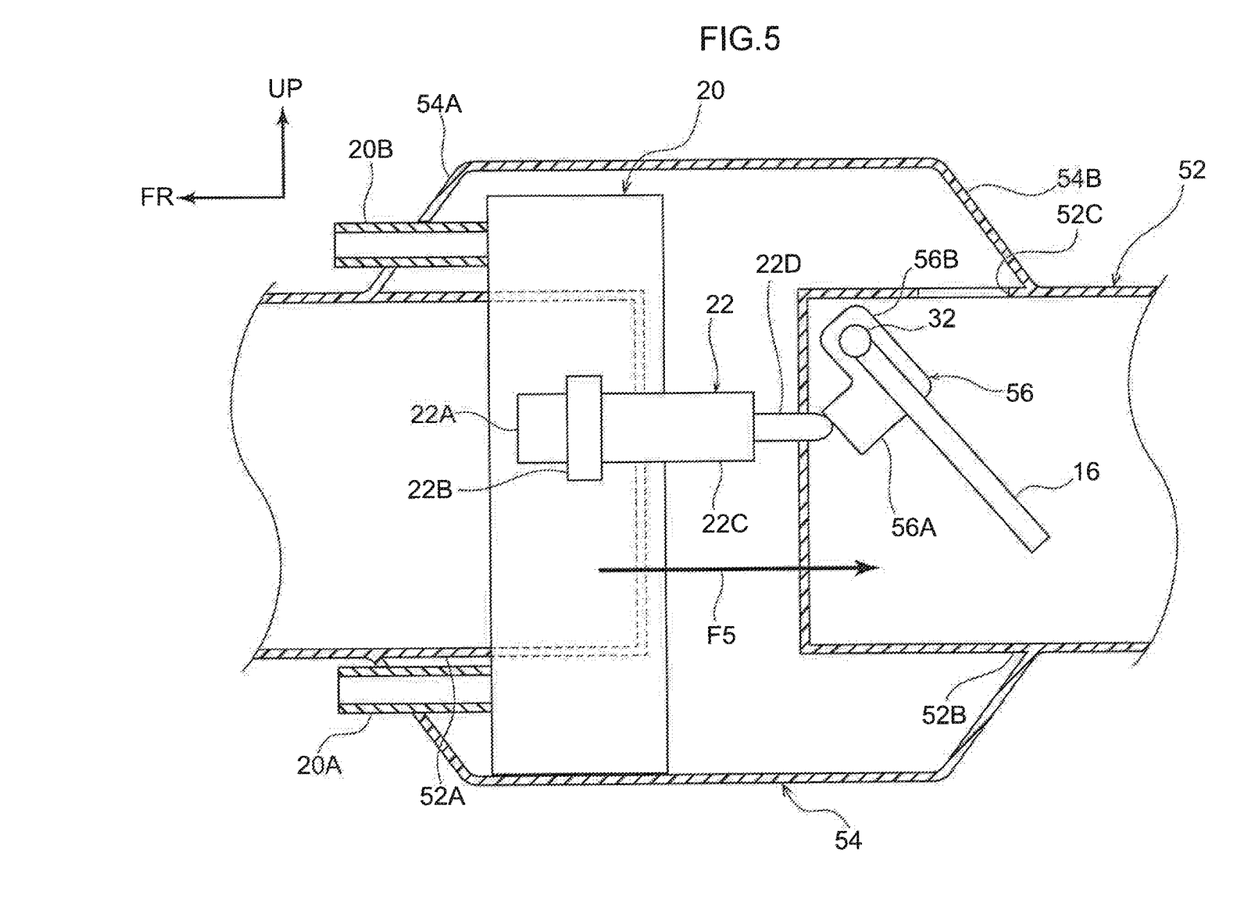
FIG. 5 is a sectional diagram corresponding to FIG. 4, showing a state in which the valve is opened.
Figure 6:
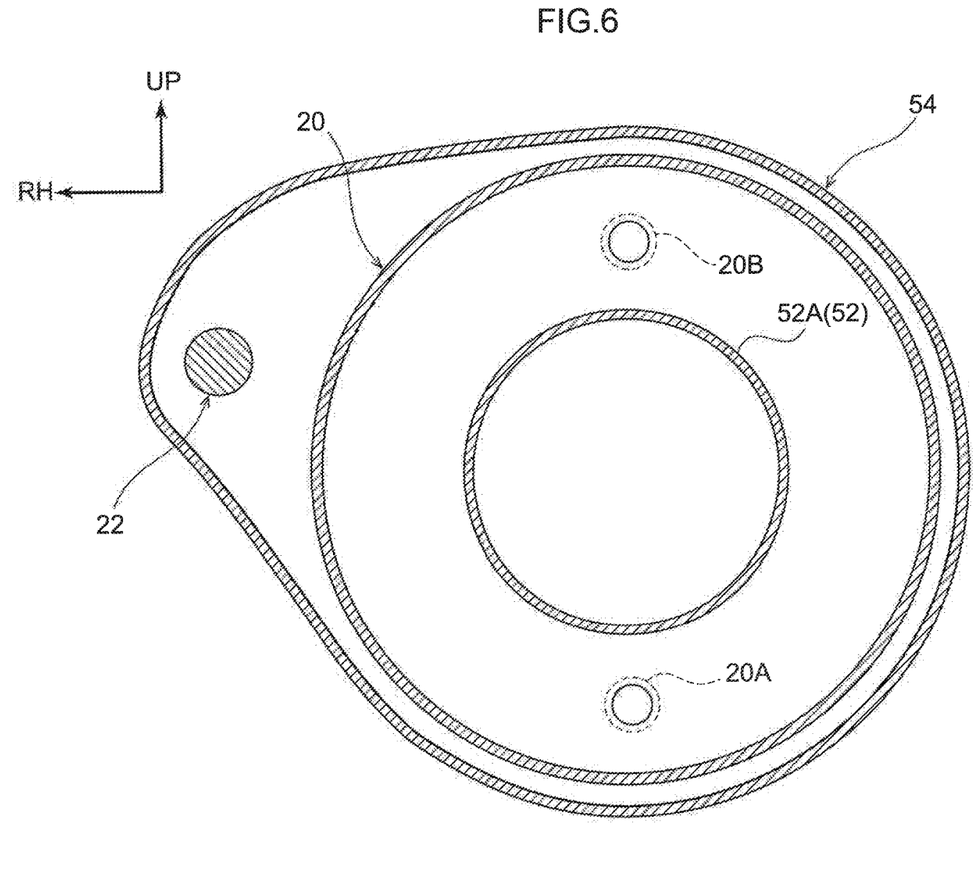

Now, an exhaust heat recovery structure according to a second exemplary embodiment is described with reference to FIG. 4 to FIG. 6. Overall structure of the exhaust system is similar to the structure in FIG. 2, apart from the principal portions shown in FIG. 4 to FIG. 6. Structures that are the same as in the first exemplary embodiment are assigned the same reference numerals and, as appropriate, are not described. For convenience of explanation, a driving cam 56 and the thermostat 22 are shown in FIG. 4 and FIG. 5. In practice, however, the driving cam 56 and the thermostat 22 would be disposed to the paper surface side of the drawing relative to a first pipe 52.

As shown in FIG. 4, the exhaust heat recovery structure according to the present exemplary embodiment is a coaxial-type structure in which the first pipe 52 and a second pipe 54 are provided concentrically. The first pipe 52 extends in the vehicle front-and-rear direction. Exhaust gas from the engine flows in the first pipe 52 (see FIG. 1).

In this exemplary embodiment, the first pipe 52 is separated into a front side first pipe 52A and a rear side first pipe 52B. The front side first pipe 52A is at the vehicle front side of a branching region between the first pipe 52 and the second pipe 54, and the rear side first pipe 52B is at the vehicle rear side of the branching region. The front side first pipe 52A and rear side first pipe 52B are spaced apart in the vehicle front-and-rear direction and disposed to be coaxial.

The second pipe 54 is formed in a substantially circular tube shape with a larger diameter than the first pipe 52. The second pipe 54 is provided to branch from the first pipe 52 and extend between the front side first pipe 52A and the rear side first pipe 52B. As shown in FIG. 6, the second pipe 54 is disposed at the outer periphery side of the first pipe 52. The heat exchanger 20 is provided between the second pipe 54 and the first pipe 52.

The heat exchanger 20 is formed in a substantially circular tube shape. As shown in FIG. 4, the heat exchanger 20 is disposed at the outer periphery side of a distal end portion of the front side first pipe 52A. The inlet portion 20A that feeds in coolant that has circulated through the engine and the outlet portion 20B that feeds out coolant are provided at the heat exchanger 20. Thus, in the heat exchanger 20, heat is exchanged between exhaust gas flowing through the second pipe 54 and the coolant.

The valve 16 is provided in the vicinity of an aperture portion of the rear side first pipe 52B. An upper end portion of the valve 16 is mounted at the turning rod 32 that extends in the vehicle width direction, in the same manner as in the first exemplary embodiment. In this structure, the rear side first pipe 52B is opened by the valve 16 swinging. The valve 16 is urged in the direction of closing by an urging member such as a spring or the like, which is not shown in the drawings.

The turning rod 32 extends outside the first pipe 52, and the driving cam 56 is mounted at the turning rod 32. The driving cam 56 is formed substantially in an "L" shape that is flipped left-to-right in a side view seen in the vehicle width direction. The driving cam 56 includes a horizontal portion 56A that extends in the vehicle front-and-rear direction and a vertical portion 56B that extends to the vehicle upper side. A rear end portion of the horizontal portion 56A and a lower end portion of the vertical portion 56B are joined together.

A penetrating hole is formed in an upper end portion of the vertical portion 56B. The turning rod 32 penetrates through this penetrating hole, and the driving cam 56 is fixed to the turning rod 32. Thus, in this structure, the turning rod 32 is turned and the valve 16 is opened and closed by the driving cam 56 swinging about the upper end portion of the vertical portion 56B.

The thermostat 22 is provided to the vehicle front side of the driving cam 56. In the present exemplary embodiment, the heat-sensing portion 22A of the thermostat 22, the large diameter portion 22B and a portion of the shaft cover 22C are disposed inside the heat exchanger 20. The shaft 22D opposes the horizontal portion 56A of the driving cam 56 in the vehicle front-and-rear direction. When the heat-sensing portion 22A is heated, the paraffin wax expands and the shaft 22D moves toward the vehicle rear side.

—Operation and Effects—

Now, operation and effects of the exhaust heat recovery structure according to the present exemplary embodiment are described.

In the present exemplary embodiment, at a time of cold starting, the valve 16 is closed and flows of exhaust gas from the front side first pipe 52A into the rear side first pipe 52B are blocked. Therefore, as shown by arrows F3 in FIG. 4, most of the exhaust gas flows toward the vehicle front side and is blown against the heat exchanger 20. The exhaust gas passes along the heat exchanger 20 through a gap between the second pipe 54 and the heat exchanger 20. As a result, coolant flowing in the heat exchanger 20 may be heated and warm-up of the engine may be accelerated.

The exhaust gas that has flowed to the vehicle front side turns back at a front end portion of the second pipe 54 and flows toward the vehicle rear side along the inner wall of the second pipe 54. The exhaust gas flows into the rear side first pipe 52B through one or a plural number of vent apertures 52C that are formed in an outer periphery face of the rear side first pipe 52B (see arrows F4 in FIG. 4).

When the temperature of the coolant in the heat exchanger 20 rises and the heat-sensing portion 22A is heated up to the predetermined temperature, as shown in FIG. 5, the shaft 22D pushes the driving cam 56 to the vehicle rear side, causing the valve 16 to swing to the vehicle rear side. As a result, the rear side first pipe 52B is opened and exhaust gas flows linearly from the front side first pipe 52A into the rear side first pipe 52B (see arrow F5 in FIG. 5). Hence, flow amounts of exhaust gas flowing into the second pipe 54 are reduced and boiling of the coolant may be suppressed. In the present exemplary embodiment, the exhaust heat recovery structure may be structured more compactly than in the first exemplary embodiment.

The first and second exemplary embodiments of the present invention have been described hereabove but the present invention is not limited by the structures described above and it will be clear that the present invention may be embodied in numerous modes beside the above structures within a scope that does not depart from the gist of the present invention. For example, in the first exemplary embodiment, the valve 16 is provided at the first pipe 12 as shown in FIG. 2, but the present invention is not limited thus. A structure is possible in which the valve 16 is provided at the second pipe 18. In this case, exhaust gas may be allowed to flow in the second pipe 18 by the valve 16 provided at the second pipe 18 being urged in a direction of opening by an urging member such as a spring or the like. If the valve 16 is closed by the shaft 22D of the thermostat 22 at a time at which the temperature of the heat-sensing portion 22A of the thermostat 22 rises beyond the predetermined temperature, flows of exhaust gas in the second pipe 18 cease and boiling of the coolant may be suppressed.

In the exemplary embodiments described above, driving cams with substantial "L" shapes are used, but the present invention is not limited thus and driving cams with alternative shapes may be used. Further, structures are possible in which no driving cam is used but a valve is pushed open directly by a shaft.

In the second exemplary embodiment, as shown in FIG. 4, the thermostat 22 is disposed a little to the upper side of a vehicle up-and-down direction central region of the heat exchanger 20, but this is not limiting. For example, the thermostat 22 may be disposed at an upper end portion of the interior of the heat exchanger 20. In this case, the first pipe 52 may be controlled to open in accordance with the temperature of the coolant flowing in the heat exchanger 20 that is at the highest temperature. Thus, boiling of the coolant may be suppressed effectively.

In the exemplary embodiments described above, the thermostat 22 that utilizes expansion of a wax is employed, but this not limiting. A thermostat that utilizes a bimetallic strip in which metal plates of two kinds with different thermal expansion coefficients are stuck together. In this case, when the bimetallic element disposed at the heat-sensing portion is heated, the bimetallic element bends, pushing out the shaft and causing the driving cam to swing.

The shape and size of the thermostat 22 may be freely modified, and a number of the thermostat 22 is not particularly limited.

What is claimed is:

1. An exhaust heat recovery structure comprising:
a first pipe through which exhaust gas from an engine flows;
a second pipe that branches from the first pipe and at which a heat exchanger is provided, the heat exchanger exchanging heat between a coolant and exhaust gas;
a valve provided at one of the first pipe or the second pipe, the valve adjusting a flow amount of exhaust gas flowing into the second pipe by opening and closing; and
a thermostat equipped with a heat-sensing portion that is disposed at an interior of the heat exchanger, the thermostat opening or closing the valve and reducing the flow amount of exhaust gas flowing into the second pipe when a temperature of the heat-sensing portion is high, the heat-sensing portion extending away from a cover of the thermostat in a direction opposite the valve.

2. The exhaust heat recovery structure according to claim 1, wherein the heat-sensing portion includes an upper end portion that is disposed furthest from the valve.

3. The exhaust heat recovery structure according to claim 1, wherein a circulation pump that circulates the coolant between the engine and the heat exchanger is provided, the circulation pump being temporarily stopped at a time of cold starting.

4. The exhaust heat recovery structure according to claim 2, wherein a circulation pump that circulates the coolant between the engine and the heat exchanger is provided, the circulation pump being temporarily stopped at a time of cold starting.

5. The exhaust heat recovery structure according to claim 2, wherein the exhaust heat recovery structure is disposed in a vehicle and the upper end portion is disposed adjacent to a vehicle upper side of the interior of the heat exchanger.

6. The exhaust heat recovery structure according to claim 1, wherein the heat exchanger is disposed within the second pipe.

7. The exhaust heat recovery structure according to claim 1, wherein the thermostat includes a shaft for actuating the valve and at least a portion of the shaft extends between the first pipe and the second pipe.

8. An exhaust heat recovery structure comprising:
a first pipe through which exhaust gas from an engine flows;
a second pipe that branches from the first pipe and at which a heat exchanger is provided, the heat exchanger exchanging heat between a coolant and exhaust gas;
a valve provided at one of the first pipe or the second pipe, the valve adjusting a flow amount of exhaust gas flowing into the second pipe by opening and closing; and
a thermostat equipped with a heat-sensing portion that is disposed at an interior of the heat exchanger, the thermostat opening or closing the valve and reducing the flow amount of exhaust gas flowing into the second pipe when a temperature of the heat-sensing portion is high, the thermostat including a shaft for actuating the valve and at least a portion of the shaft extending between the first pipe and the second pipe.

9. The exhaust heat recovery structure according to claim 8, wherein the heat exchanger is disposed within the second pipe.

10. The exhaust heat recovery structure according to claim 8, wherein a circulation pump that circulates the coolant between the engine and the heat exchanger is provided, the circulation pump being temporarily stopped at a time of cold starting.

11. The exhaust heat recovery structure according to claim 8, wherein the heat-sensing portion includes an upper end portion that is disposed furthest from the valve.

12. The exhaust heat recovery structure according to claim 11, wherein a circulation pump that circulates the coolant between the engine and the heat exchanger is provided, the circulation pump being temporarily stopped at a time of cold starting.

13. The exhaust heat recovery structure according to claim 11, wherein the exhaust heat recovery structure is disposed in a vehicle and the upper end portion is disposed adjacent to a vehicle upper side of the interior of the heat exchanger.

* * * * *